US008509692B2

(12) United States Patent
Ryle et al.

(10) Patent No.: US 8,509,692 B2
(45) Date of Patent: Aug. 13, 2013

(54) SYSTEM AND METHOD FOR REAL-TIME WIRELESS TRANSMISSION OF DIGITAL AUDIO SIGNAL AND CONTROL DATA

(75) Inventors: Marcus Ryle, Westlake Village, CA (US); Guy Coker, Rocklin, CA (US)

(73) Assignee: Line 6, Inc., Calabasas, CA (US)

( * ) Notice: Subject to any disclaimer, the term of this patent is extended or adjusted under 35 U.S.C. 154(b) by 414 days.

(21) Appl. No.: 12/422,798

(22) Filed: Apr. 13, 2009

(65) Prior Publication Data

US 2010/0022183 A1 Jan. 28, 2010

Related U.S. Application Data

(63) Continuation of application No. 12/178,928, filed on Jul. 24, 2008.

(51) Int. Cl.
*H04B 7/00* (2006.01)

(52) U.S. Cl.
USPC ...... 455/41.3; 455/39; 455/553.1; 455/575.2; 84/600; 84/609; 84/622; 84/645; 84/721; 84/735; 84/478; 84/616; 84/610; 84/746; 84/723

(58) Field of Classification Search
USPC ................ 455/575.2; 84/600, 609, 622, 645, 84/721, 735, 478, 616, 610, 659, 746, 723
See application file for complete search history.

(56) References Cited

U.S. PATENT DOCUMENTS

| | | | | |
|---|---|---|---|---|
| 5,345,187 | A | 9/1994 | McGuire | |
| 6,301,313 | B1 | 10/2001 | Gevargiz et al. | |
| 6,570,078 | B2 * | 5/2003 | Ludwig | 84/600 |
| 6,621,853 | B1 | 9/2003 | Ku | |
| 6,689,947 | B2 * | 2/2004 | Ludwig | 84/721 |
| 6,852,919 | B2 * | 2/2005 | Ludwig | 84/735 |
| 6,895,059 | B2 | 5/2005 | Rogerson et al. | |
| 6,990,317 | B2 | 1/2006 | Arnold | |
| 7,217,878 | B2 * | 5/2007 | Ludwig | 84/609 |
| 7,309,829 | B1 * | 12/2007 | Ludwig | 84/622 |
| 7,499,462 | B2 | 3/2009 | MacMullan | |
| 7,786,370 | B2 * | 8/2010 | Ludwig | 84/645 |
| 2002/0005111 | A1 * | 1/2002 | Ludwig | 84/645 |
| 2002/0007723 | A1 * | 1/2002 | Ludwig | 84/645 |
| 2004/0065187 | A1 * | 4/2004 | Ludwig | 84/645 |
| 2005/0130717 | A1 * | 6/2005 | Gosieski et al. | 455/575.2 |
| 2007/0184875 | A1 * | 8/2007 | Rybicki | 455/553.1 |

OTHER PUBLICATIONS

U.S. Appl. No. 12/178,928 Office Action, mailed Nov. 29, 2010.
Office Action dated Aug. 2, 2011, U.S. Appl. No. 12/178,928.

* cited by examiner

*Primary Examiner* — April G Gonzales
(74) *Attorney, Agent, or Firm* — Blakely Sokoloff Taylor & Zafman LLP

(57) ABSTRACT

Disclosed is a system and method for the real-time wireless transmission of a digital audio signal and control data. A transmitter may be coupled to an audio source. The transmitter includes a processor to combine control data with a digital audio signal from the audio source and the processor wirelessly transmits the combined control data and digital audio signal to a receiver. The receiver includes a processor that is used to receive the combined control data and digital audio signal and to process the control data to perform a user predefined function.

52 Claims, 10 Drawing Sheets

SYSTEM AND METHOD FOR REAL-TIME WIRELESS TRANSMISSION OF DIGITAL AUDIO SIGNAL AND CONTROL DATA

This Application is a Continuation-in-Part of U.S. Ser. No. 12/178,928 filed Jul. 24, 2008.

BACKGROUND

During a recording or live performance, musicians and singers often desire the freedom of being able to have their musical instrument or voice audio signals being connected to recording or amplification devices without the encumbrance of an electrical cable.

Analog wireless systems that transmit audio signals over radio frequencies have existed for many decades and have been a viable solution but they include many limitations. Analog transmission systems for audio signals typically have limited bandwidth and dynamic range and the analog transmission system is susceptible to unwanted radio interference being heard through the audio system. With an analog system, as the radio frequency degrades, or interference occurs, the audio quality degrades.

In typical digital wireless systems, once the radio signal has degraded to a level in which the digital data is unreadable, the audio signal must be muted. As a result, typical digital audio wireless systems often include bidirectional communications that permit the receiver to request the retransmission of the digital audio data. Unfortunately, latency (i.e., delay time) is introduced to allow time for the retransmission.

In many cases, the latency associated with the wireless transmission of digital audio can be easily tolerated. For example, digitally transmitting audio that is being played from a recording can contain latency in the tens of milliseconds without being obvious to the listener.

On the other hand, performers of live music can tolerate only very low latency (e.g., 5 milliseconds or less) before the latency can negatively affects the performance and interaction of musicians. As a result, present techniques for the retransmission of digital audio are not a viable solution because of the amount of time required for retransmission.

DETAILED DESCRIPTION

Figure 1:
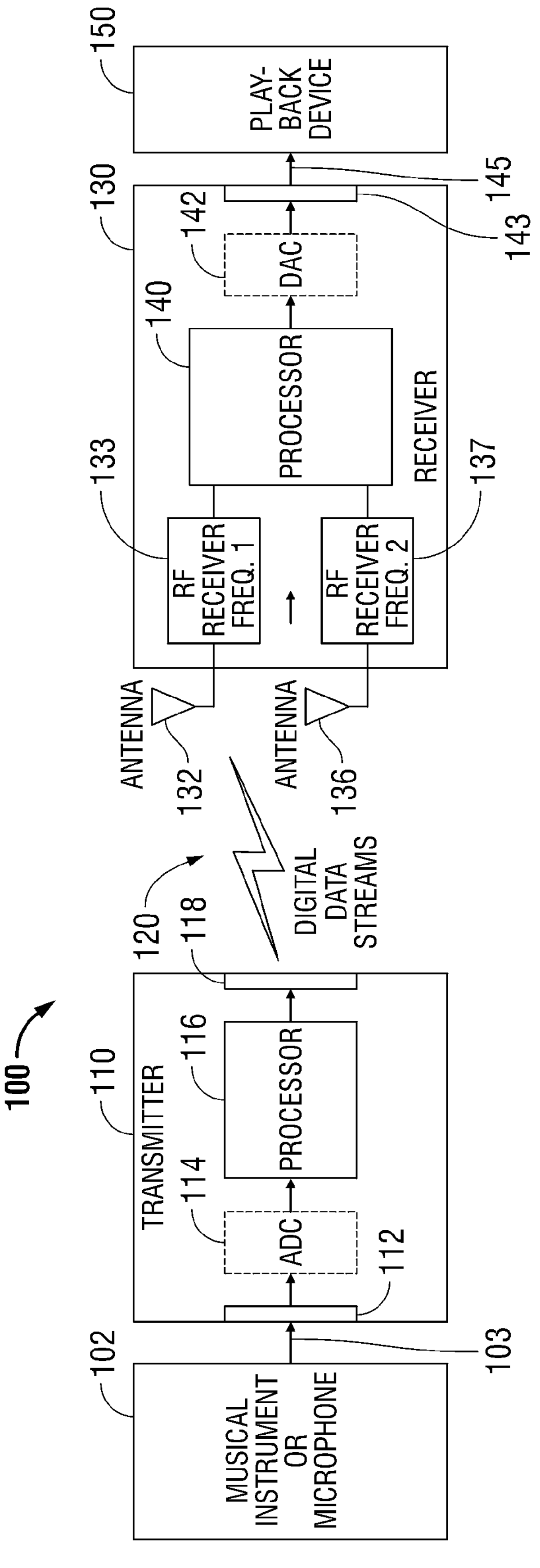
FIG. 1 is a block diagram of a system for the wireless transmission of digital audio signals, according to one embodiment of the invention.

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, processes, interfaces, electrical structures, circuits, etc. are not described in detail, or are shown in block diagram form, in order not to obscure the present invention. Furthermore, aspects of the invention will be described in particular embodiments but may be implemented in hardware, software, firmware, middleware, or a combination thereof.

In the following description, certain terminology is used to describe features of the invention. For example, a "component", or "computing device", or "client device", or "computer" includes hardware and/or software module(s) that are configured to perform one or more functions.

Further, a "processor" is logic that processes information. Examples of a processor include a central processing unit (CPU), microprocessor, an application specific integrated circuit (ASIC), a digital signal processor (DSP), a micro-controller, a finite state machine, a field programming gate array (FPGA), combinatorial logic, etc.

A "software module" is executable code such as an operating system, an application, an applet or even a routine. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

A "connector," "interconnect," or "link" is generally defined as an information-carrying medium that establishes a communication pathway. Examples of the medium include a physical medium (e.g., electrical cable, electrical fiber, optical fiber, bus traces, etc.) or a wireless medium (e.g., air in combination with wireless signaling technology).

"Information" or "data stream" is defined as data, address, control or any combination thereof. For transmission, information may be transmitted as a message, namely a collection of bits in a predetermined format. One particular type of message is a frame including a header and a payload, each having a predetermined number of bits of information.

Embodiments of the invention relate to a system and method for the wireless transmission of digital audio signals. In one embodiment, a transmitter including a processor may be used to: generate a first digital data stream and a second digital data stream from a digital audio signal and transmit the first digital data stream at a first radio frequency and the second digital data stream at a second radio frequency. A receiver including a processor may be utilized to: receive the first and second digital data streams at the first and second radio frequencies, respectively, and generate the digital audio signal from the first and second digital data streams.

With reference now to FIG. 1, FIG. 1 is a block diagram of a system 100 for the wireless transmission of digital audio signals, according to one embodiment of the invention. As shown in FIG. 1, a musical instrument or microphone 102 may be coupled to a transmitter 110. For example, musical instrument 102 may be a guitar, a piano, a keyboard, a bass, or any type of musical instrument. Additionally, a microphone may be coupled to transmitter 110.

The musical instrument or microphone may be a digital or analog device. Typically, musical instrument or microphone 102 is coupled via a wired connector 103 (analog or digital), such as an electric cable, to an input device (analog or digital) 112 for transmitter 110. Thus, transmitter 110 is coupled to the musical instrument 102. Additionally, transmitter 110 may be directly attached or built into musical instrument or microphone 102 so as to appear to be one device.

Transmitter 110 may include an analog to digital converter (ADC) 114 coupled to a processor 116 and a digital wireless output device 118 coupled to processor 116.

It should be appreciated that ADC 114 may or may not be utilized dependent upon the type of musical instrument or microphone 102. For example, musical instruments or microphones 102 that are digital may be directly coupled by digital input device 112 to processor 116.

On the other hand, analog musical instruments or microphones may be connected via analog input device 112 to ADC 114 such that the analog audio signals are converted by ADC 114 to a digital signal for processing by processor 116.

For example, transmitter 110 may include a button selectable by a user to indicate whether or not an analog or digital musical instrument or microphone is being utilized to turn on or off ADC 114. Alternatively, transmitter 110 may simply determine whether a digital or analog signal is being utilized and select or deselect ADC 114.

In either event, processor 116 of transmitter 110 is utilized to generate digital data streams 120 for transmission to a receiver 130 through digital wireless output device 118.

In particular, processor 116 generates at least a first digital data stream and a second digital data stream from the digital audio signal from ADC 114 or directly from the digital musical instrument or microphone. Next, transmitter 110 through digital wireless output device 118 transmits the first digital data stream at a first radio frequency and the second digital data stream at a second radio frequency (shown as digital data streams 120), as will be described in more detail later, to receiver 130.

The digital representation of the digital audio signal is prepared by processor 116 for wireless transmission. Thus, processor 116 generates digital data streams 120 at particular frequencies for wireless transmission. Examples of a processor include a central processing unit (CPU), microprocessor, an application specific integrated circuit (ASIC), a digital signal processor (DSP), a micro-controller, a finite state machine, a field programming gate array (FPGA), combinatorial logic, etc.

These functions can be implemented by processor 116 as one or more instructions (e.g. code segments), to perform the desired functions or operations of the invention. When implemented in software (e.g. by a software or firmware module), the elements of the present invention are the instructions/code segments to perform the necessary tasks. The instructions which when read and executed by a machine or processor, cause the machine or processor to perform the operations necessary to implement and/or use embodiments of the invention. The instructions or code segments can be stored in a machine readable medium (e.g. a processor readable medium or a computer program product), or transmitted by a computer data signal embodied in a carrier wave, or a signal modulated by a carrier, over a transmission medium or communication link.

Further, processor 116 may process the digital audio data such that it also includes additional codings such as: error correction code (ECC), cyclic redundancy check (CRC), control codes, information data, or other type of coding; that is embedded along with the digital audio data. Thus, control data and information data may also be included with the digital audio data to be wirelessly transmitted from transmitter 110 to receiver 130. For example, such control and information data that may be transmitted includes battery voltage, positional data, user interface controls (e.g. buttons, knobs, etc.) of the transmitter, musical instrument, or microphone related to volume, gain, tone, pick-up selections, etc.

After the digital audio data is ready for wireless transmission, processor 116 through digital wireless output device 118 sends the digital audio data through digital data streams 120 at different radio frequencies to receiver 130. Particularly, the digital audio data may be sent on as little as two separate radio frequencies or as many as n frequencies, as will be described in more detail later.

Digital data streams 120 that include at least first and second digital data streams at first and second radio frequencies, respectively, are received at receiver 130. For example, in one embodiment, receiver 130 may include a first antenna 132 coupled to a first RF Receiver 133 operating at the first frequency and a second antenna 136 coupled to a second RF Receiver 137 operating at the second radio frequency both of which may be coupled to processor 140.

Processor 140 may then generate the same digital audio signal from the first and second digital data streams for transmission to a play-back device 150 such that the play-back device can play the generated digital audio signal. For example, play-back device 150 may be an amplifier, a stereo, head-phones, or other well-known types of play-back devices.

Further, the generated digital audio signal may be converted by a digital to analog converter (DAC) 142 into an analog signal that is transmitted through output device 143 and through wired connector 145 for play-back by play-back device 150 that is an analog play-back device.

It should be appreciated that play-back device 150, in some embodiments, may be a digital play-back device and the digital audio signal may be directly played back, without conversion by DAC 142, by being sent through output device 143 and through wired connector 145 to play-back device 150 that is a digital play-back device. For example, at the receiver device 130, a user may select analog or digital play-back by a suitable button selection or receiver 130 may determine the type of play-back device attached to receiver 130 and selects whether to utilize or not utilize DAC 142. Additionally, receiver 130 may be directly attached to or embedded within play-back device 150 so as to appear as a single device.

Thus, receiver 130 receives digital data streams 120 including at least first and second digital data streams transmitted at first and second radio frequencies, respectively. However, different numbers of digital data streams and radio frequencies may be utilized, as will be described in more detail later.

In one embodiment, processor 140 decodes the received multiple digital data streams and converts them into the same transmitted digital audio signal and sends the digital audio signal to DAC 142, internal to receiver 130, for conversion to analog audio for play-back by an analog audio play-back device, such as an amplifier.

Additionally, as will be described in more detail later, either the analog or digital audio signals may be sent back to storage devices, recording devices, recording equipment, computers, or stereos.

The digital data streams 120 may be sent utilizing device specific digital audio formats or by existing digital audio formats such as audio engineering society (AES)/European Broadcasting Union (EBU) or S/PDIF formats. As will be described, the digital data streams may be received simultaneously or in multiple time slots.

Further, although two antennas 132 and 136 and corresponding RF receivers 133 and 137 are shown in receiver 130, it should be appreciated that only one antenna and one RF receiver may be utilized or multiple antennas and multiple RF receivers may be utilized and interconnected depending upon the type of application. Thus, any combination of multiple antennas and multiple receivers may be utilized.

In one embodiment, musical instrument or microphone 102 may be connected to transmitter 110 and thereby wirelessly to receiver 130 for a live performance. In this embodiment, the sizes of the first and second digital data streams 120 and the frequencies of the first and second radio frequencies are selected by processor 116 of transmitter 110 to ensure a low latency generation of the digital audio signal at receiver 130 and low latency play-back of the generated audio signal at the play-back device 150, such as an amplifier.

In one embodiment, the low latency may be less than five milliseconds.

By utilizing more than one radio frequency for operation, this allows for interference from outside radio frequencies to reduce the jamming of the radio frequency signals used by transmitter 110 to receiver 130. This type of transmission allows for low latency because there is no long block code or retransmission needed to cover for a jammed frequency during a time period. The end result is more data throughput due to less interference. When interference does occur, the data errors that are received can be easily corrected or concealed by processor 140 of receiver 130 without notice to the user or audience. Thus, the result is a real-time wireless audio device that has low enough latency for pro-audio use while still providing significant resistance to data loss due to radio frequency interference.

Figure 2:
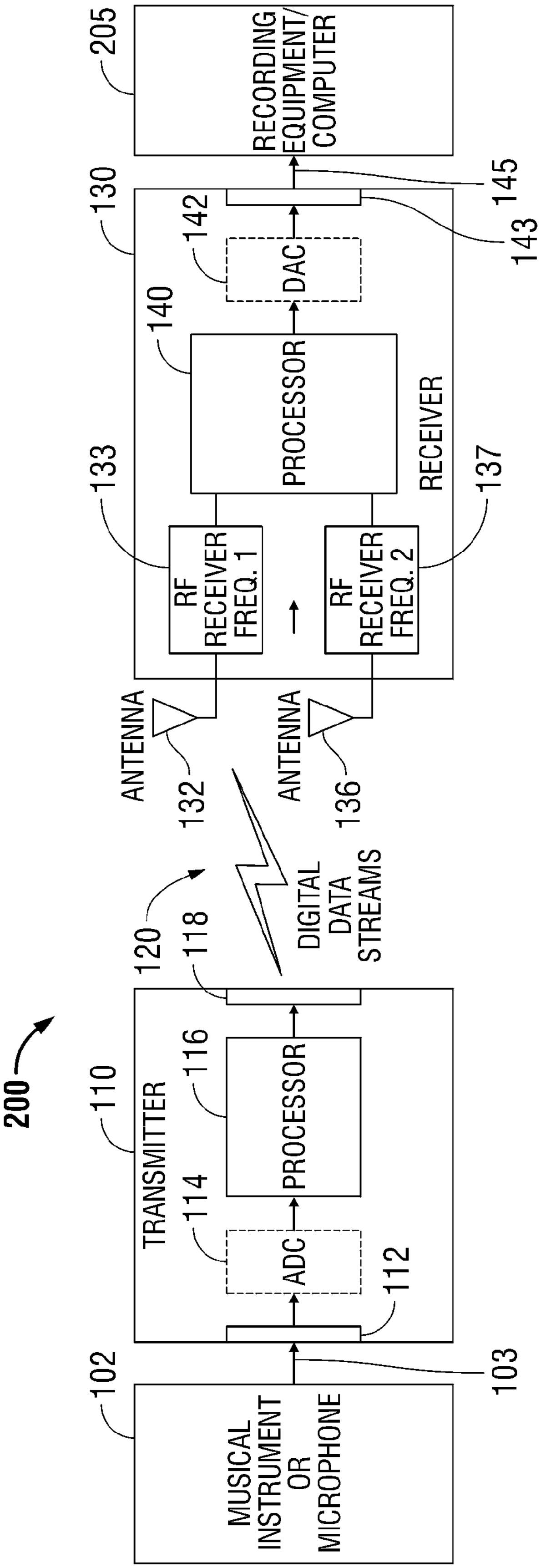
FIG. 2 is a block diagram of a system for the wireless transmission of digital audio signals, according to one embodiment of the invention.

With reference now to FIG. 2, FIG. 2 is a block diagram of a system 200 for the wireless transmission of digital audio signals, according to one embodiment of the invention. System 200 is very similar to previously-described system 100. It should be noted that as shown in FIG. 2, a musical instrument or microphone 102 may be wirelessly connected through transmitter 110 and receiver 130, as previously described. However, in system 200 instead of a digital or analog play-back device, musical instrument or microphone 102 is connected to digital or analog recording equipment or a computer system 205.

Figure 3:
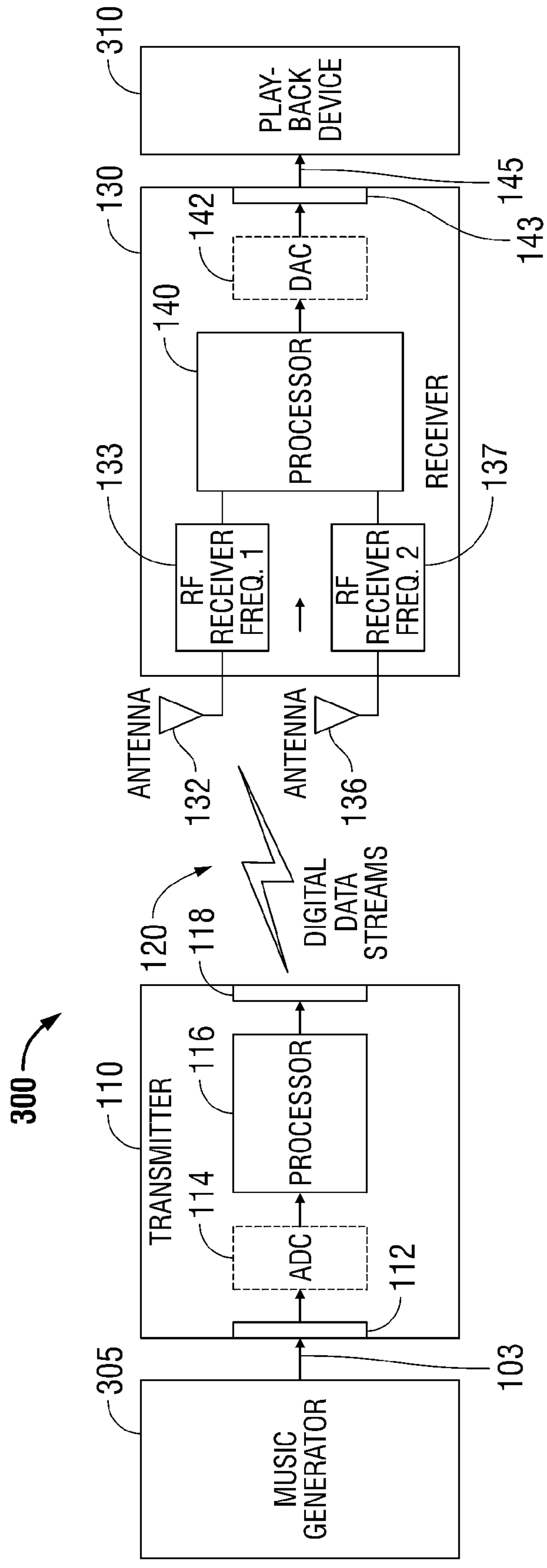
FIG. 3 is a block diagram of a system for the wireless transmission of digital audio signals, according to one embodiment of the invention.

With reference now to FIG. 3, FIG. 3 is a block diagram of a system 300 for the wireless transmission of digital audio signals, according to one embodiment of the invention. System 300 is very similar to previously-described system 100. However, in system 300, a musical generator 305 is wirelessly connected to a digital or audio play-back device 310 through transmitter 110 and receiver 130, as previously described.

Music generator 300 may be a compact disk (CD) player, a digital video disk (DVD), an MP3 player, a computer, a cassette player, a record player or other types of digital or analog music generators and may be wirelessly connected between transmitter 110 and receiver 130 to a digital or analog play-back device 310, as previously described.

In one embodiment of the invention, digital audio data is transmitted by transmitter 110 in part or in whole on at least two independent radio frequencies for a single audio digital data stream 120. Data interleaving, error detection, error correction, and distribution techniques may be utilized to maximize the amount of breaks in transmission that can be tolerated with no interruption of audio or with subtle error concealment. Because there is data available on at least two independent frequencies, one of the frequencies may be unreadable at the receiver 130 for up to an indefinite period of time while audio can still be heard through a play-back device due to the data on the alternate frequency.

As will be described, the transmission by transmitter 110 of multiple frequencies can be simultaneous or alternating in nature. The data transmitted on the separate frequencies may be redundant data or interleaved data. The number of frequencies can be as little as two separate frequencies, however, may be up to any number (n) of separate frequencies. The frequencies can be collected at the receiver 130 simultaneously or alternating at some combination thereof.

The digital data streams may be sent utilizing device specific digital audio formats or by existing digital audio formats such as audio engineering society (AES)/European Broadcasting Union (EBU) or S/PDIF formats.

Further, it should be appreciated that techniques for the wireless transmission of digital data through useable radio frequency bands is well known to those of skill in the art. As is well known, radio frequency bands may be selected by transmitter 110 and receiver 130 for digital data streams 120 at any useable frequency band, and can utilize any of the well known methods for transmitting data through radio frequency bands such as: FSK, CPFSK, MFSK, QPSK, QAM, OFDM, etc.

Figure 4:
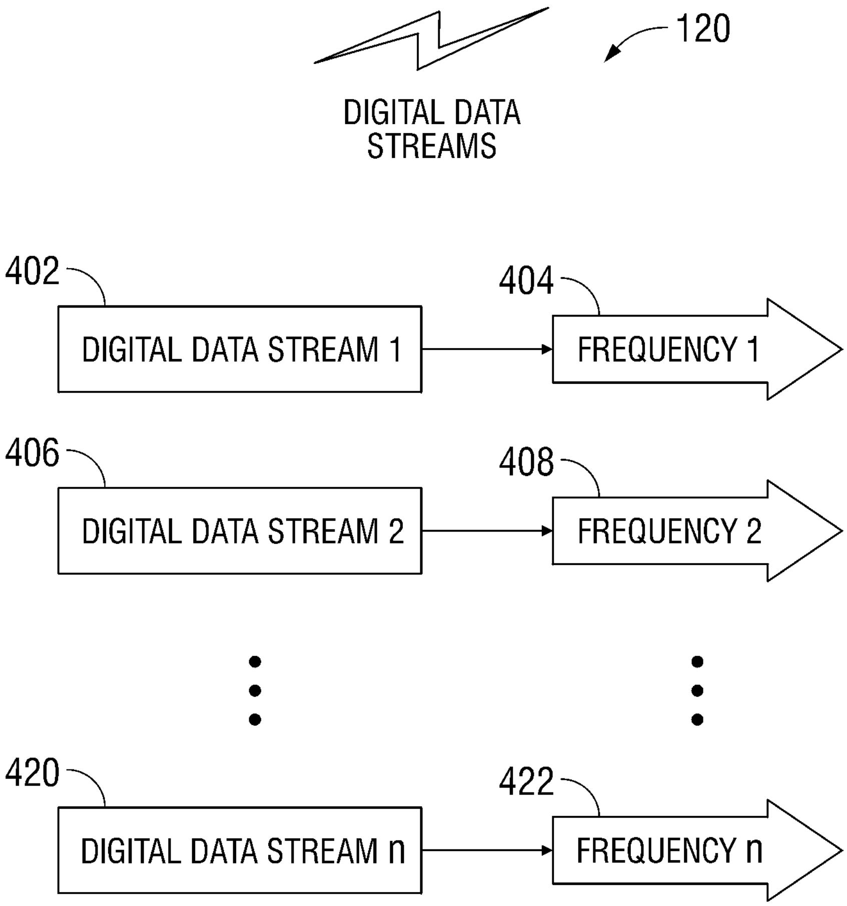
FIG. 4 is a block diagram illustrating components of digital data streams, according to one embodiment of the invention.

Turning now to FIG. 4, FIG. 4 is a block diagram illustrating components of digital data streams 120, according to one embodiment of the invention. As can be seen in FIG. 4, digital data streams 120 may include any number of digital data streams. For example, digital data streams 120 may include a first digital data stream 1 402 at a first RF frequency 1 404, a second digital data stream 2 406 at a second radio frequency 2 408, up to a predetermined digital data stream n 420 at RF frequency n 422. Thus, digital data streams 120 may include any number of predetermined digital data streams at predetermined frequencies.

In one embodiment, as previously described, digital data streams 120 may include a first digital data stream 402 transmitted at a first radio frequency 404 and a second digital data stream 406 transmitted at a second radio frequency 408.

As can be seen in FIG. 4, each digital data stream may be transmitted by the transmitter 110 completely independently from the others on different radio frequencies. These frequencies may be separated in such a manner that they do not interfere with one another. Thus, individual data streams are allowed to arrive at the receiver 130 uninterrupted by the other independent transmissions. These data streams may be sent simultaneously or may be time multiplexed. In particular, these data streams may be different data, such as interleaved data, or redundant data.

Thus, in one embodiment, first and second digital data streams 402 and 406 generated by transmitter 110 for transmission at first and second radio frequencies 404 and 408 may be redundant data. Alternatively, in another embodiment, the first and second digital data streams 402 and 406 generated for transmission by transmitter 110 at the first and second radio frequencies 404 and 408 may be interleaved data. Thus, these data streams may be different data, such as interleaved data, or redundant data. Collision avoidance of these transmissions can be achieved by using frequencies adequately spaced in frequency or adequately time spaced. The collision avoidance may also use both time spacing and frequency spacing simultaneously.

Figure 5:
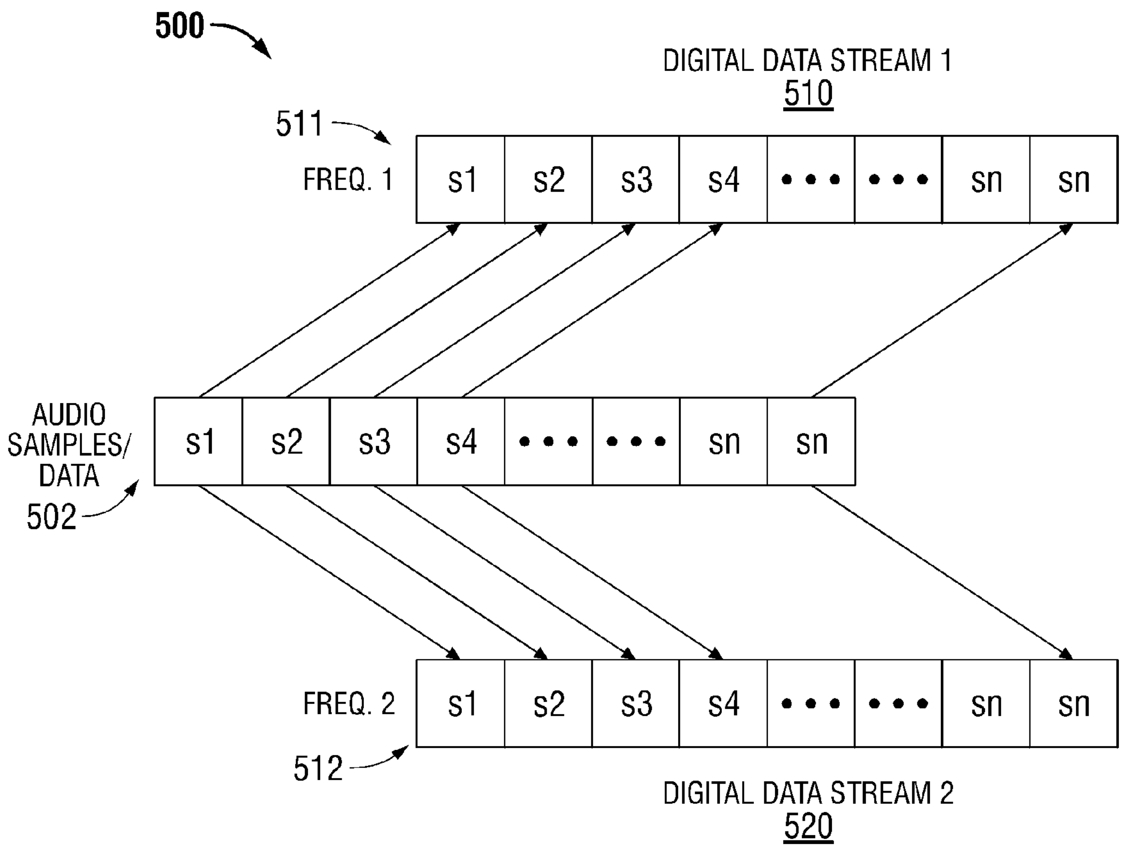
FIG. 5 is a block diagram illustrating digital audio samples/data being sent as first and second digital data streams at first and second radio frequencies as redundant data, according to one embodiment of the invention.

Turning now to FIG. 5, FIG. 5 is a block diagram 500 illustrating digital audio samples/data 500 (s1, s2, s3 . . . sn) being sent as first and second digital data streams 510 (s1, s2, s3 . . . sn) and 520 (s1, s2, s3 . . . sn) generated by the transmitter for transmission at first and second radio frequencies 511 and 512 as redundant data, according to one embodiment of the invention.

Thus, audio samples/data 502 are sent at two frequencies 511 and 512 and are sent as redundant data samples 510 and 520 of a certain size on each frequency. The number of data samples to be sent on each frequency may be of predetermined size and may be repeatedly sent in those same packet sizes. The data sample packets may also vary in length each time the frequencies are repeated in nature. In all scenarios, redundant data may be sent on each frequency.

Figure 6:
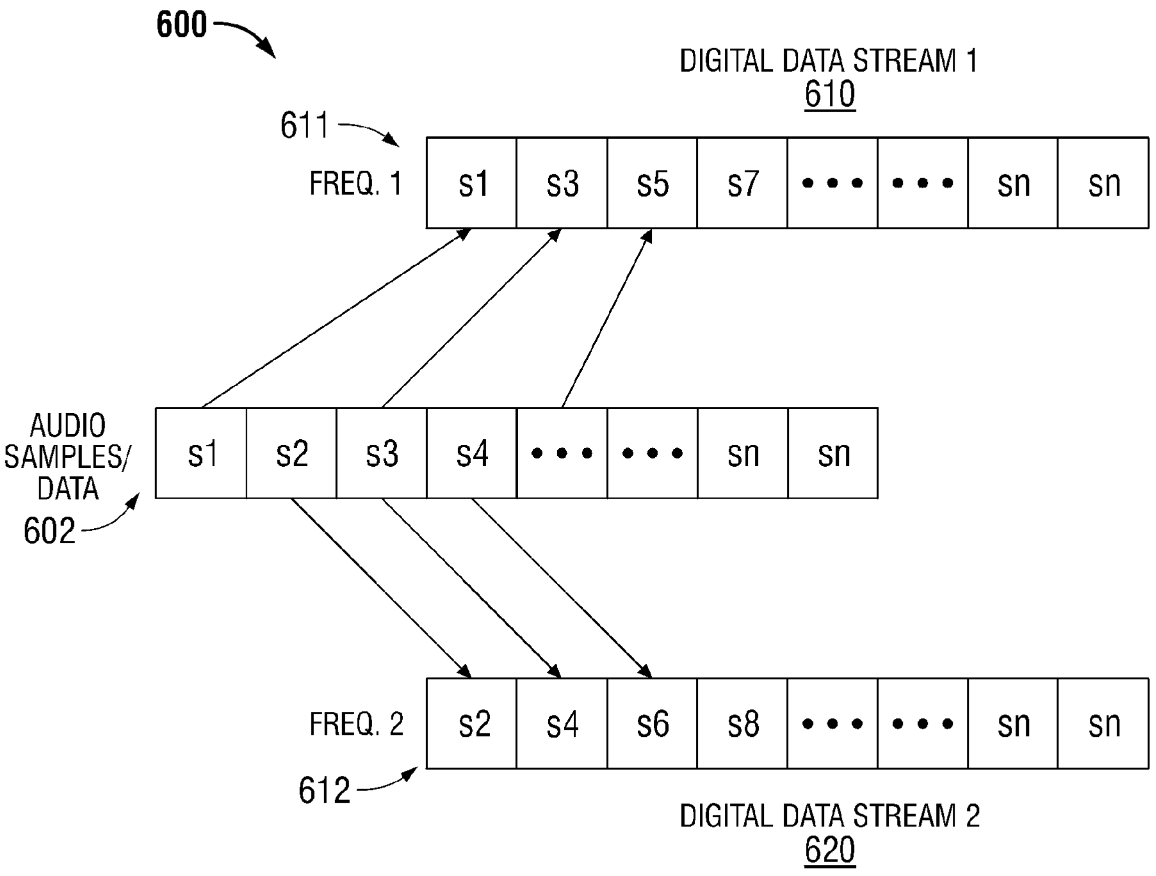
FIG. 6 is a block diagram illustrating digital audio samples/data being sent as first and second digital data streams at first and second radio frequencies as interleaved data, according to one embodiment of the invention.

With reference now to FIG. 6, FIG. 6 is a block diagram 600 illustrating digital audio samples/data 602 (s1, s2, s3, s4, s5, s6 . . . sn) being sent as first and second digital data streams 610 (s1, s3, s5 . . . sn) and 620 (s2, s4, s6 . . . sn) generated by the transmitter for transmission at first and second radio frequencies 611 and 612 as interleaved data, according to one embodiment of the invention. Thus, two frequencies 611 and 612 are utilized with alternating data samples. It should be appreciated that the frequencies 611 and 612 can be sent simultaneously or at some predetermined alternating time slots.

In particular, the interleaved data includes data samples that are alternated at the first radio frequency 611 and the second radio frequency 612 such that if an interference occurs at one of the first or second radio frequencies 611 or 612, the digital audio signal received at the receiver may be reconstructed by interpolating between the data samples on the one of the first radio frequency 611 or the second radio frequency 612 that is not subject to interference.

Figure 7:
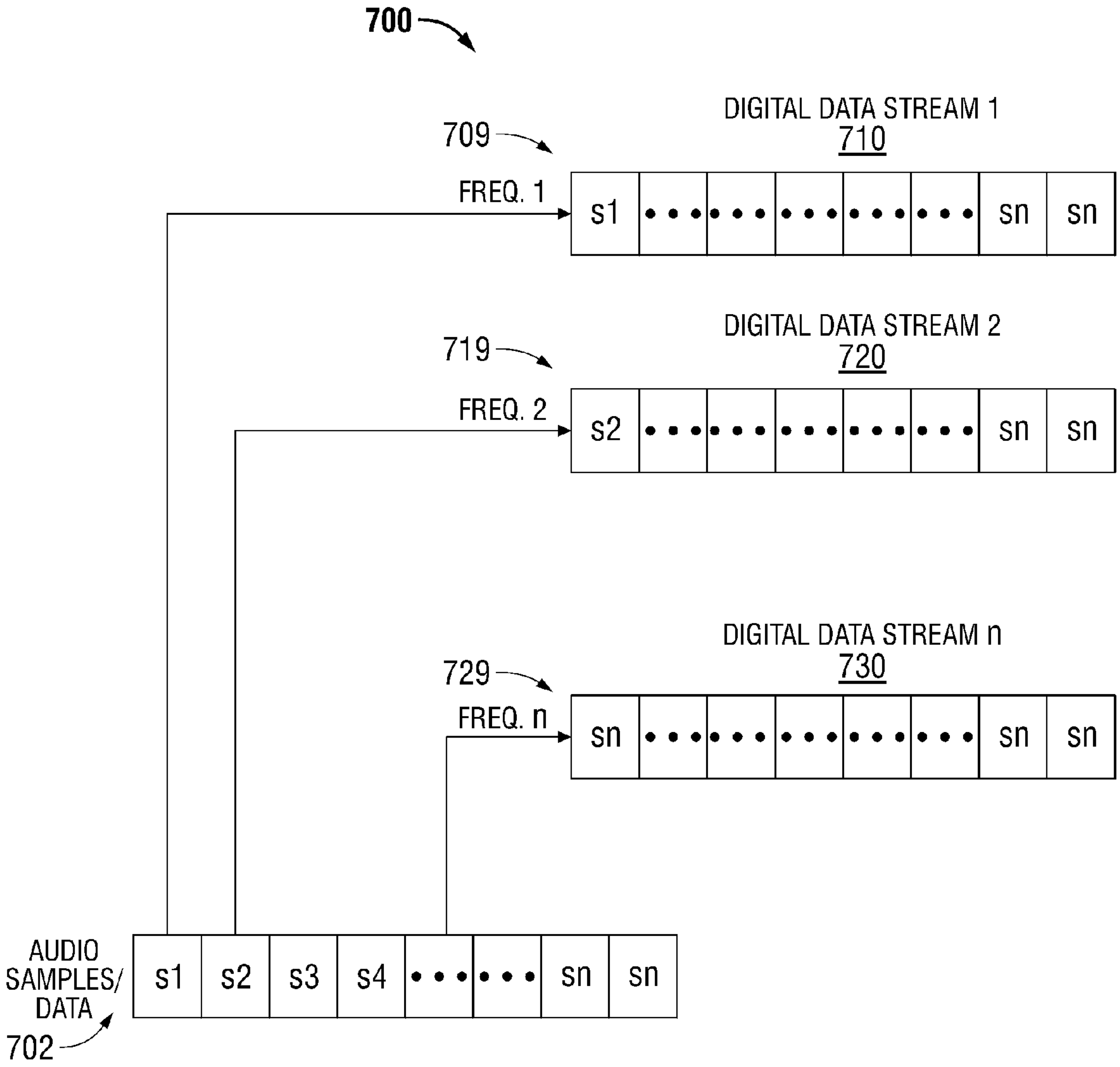
FIG. 7 is a block diagram illustrating digital audio samples/data being sent in multiple data streams at multiple frequencies, according to one embodiment of the invention.

With reference now to FIG. 7, FIG. 7 is a block diagram 700 illustrating a digital audio samples/data702 (s1, s2, s3, s4 . . . sn) being sent in multiple data streams at multiple frequencies, according to one embodiment of invention.

In particular, FIG. 7 is a block diagram 700 illustrating an embodiment where n frequencies are used to send n data samples of a certain size on each frequency. For example, at frequency 1 709, digital data stream 1 710 includes data samples s1 . . . sn. At frequency 2 719, digital data stream 2 720 includes data samples s2 . . . sn. Lastly, as an example, frequency n 729 includes digital data stream n 730 with data samples sn . . . sn. All of these are derived from digital audio samples/data 702 sn . . . sn.

The number of data samples to be sent at each frequency may be of a predetermined size and may be repeatedly sent in those same packet sizes. The data sample packets may also vary in length per frequency. For example, three data samples in succession may be utilized on each frequency. Another example may be to send three samples on frequency 1, five samples on frequency 2, two samples on frequency 3, etc. The size of sample packets may also be determined in a random nature.

It should be noted that in the radio spectrum there are a wide range of frequencies over a wide range of applications and there is never any guaranteed radio frequency. Further, there is always the risk of transmission interrupt. For example, in the radio spectrum, many types of errors may occur due to different types of devices that may occupy the same radio frequencies. Examples of these include police radio transmissions, military police radio transmissions, fire radio transmissions, different radios, etc. When digital interference occurs, the digital audio data from a transmitter may not be received.

In order to account for this, error detection, error correction, and distribution techniques (e.g., utilizing ECC, CRC, etc.) may be utilized in conjunction with the previously-described redundant and interleaved digital data streams transmitted at multiple radio frequencies set forth in FIGS. 4-7 to maximize the amount of breaks in transmission that can be tolerated with no interruption of audio or subtle error concealment. Types of error correction can be used to correct data samples or conceal data samples. Various methods for the interpolation of missing samples and error correction and detection are well known in the art. For example, utilizing error correction signals may be used to correct missing data symbols.

In particular, as previously described, by utilizing multiple radio frequencies in the transmission of digital data streams for a digital audio signal in accordance with embodiments of the invention, this allows for interference from outside radio frequencies to reduce the jamming of the radio frequency signals used by the transmitter to the receiver. Thus, latency is kept to a minimum. This type of transmission allows for low latency because there is no long block code or retransmission needed to cover for a jammed frequency during a time period. The end result is more data throughput due to less interference. When interference does occur, the data errors that are received can be easily corrected or concealed by the processor of the receiver without notice to the user or audience. Thus, the result is a robust real-time wireless audio device that has low enough latency for pro-audio use.

In another embodiment, a system and method for the real-time wireless transmission of a digital audio signal and control data is provided. A transmitter may be coupled to an audio source. The transmitter includes a processor to combine control data with a digital audio signal from the audio source and the processor wirelessly transmits the combined control data and digital audio signal to a receiver. The receiver includes a processor that is used to receive the combined control data and digital audio signal and to process the control data to perform a user pre-defined function, as will be described in more detail later.

Embodiments of the invention provide a novel and non-obvious system and method for utilizing a real-time wireless transmission to transmit additional user-controlled signal elements that can be used at a receiver to perform a wide range of user pre-defined functions, as will be described in more detail later.

As is well known in the art, presently, a musical performer often needs to communicate their musical needs to a sound person in order to implement functions such as to raise or lower their volume, change the tone, add reverberation, etc.

Typically, these types of communications are limited to hand waving or verbal commands, which can be disruptive to the musician's performance. Additionally, a sound person may want to control the aspects of the sound based on the performer's actions, such as turning down a microphone when the performer moves away from the microphone in order to reduce the pick-up of unwanted sounds.

As has been previously described, with the flexibility of digital transmissions, a digital data stream that contains a musical instrument's digital audio signal (i.e. audio data) can also contain data for the communication of other control information (i.e. control data). Embodiments of the invention relate to the additional transmission of control data to communicate data that can be generated by the performer or that may be automatically generated based on the conditions surrounding the audio source and the transmitter. The audio data from the transmitter may always be present and the decisions on how to interpret and modify the audio data based on the control data communicated to the receiver may be determined and implemented at the receiver, as will be described.

Figure 8:
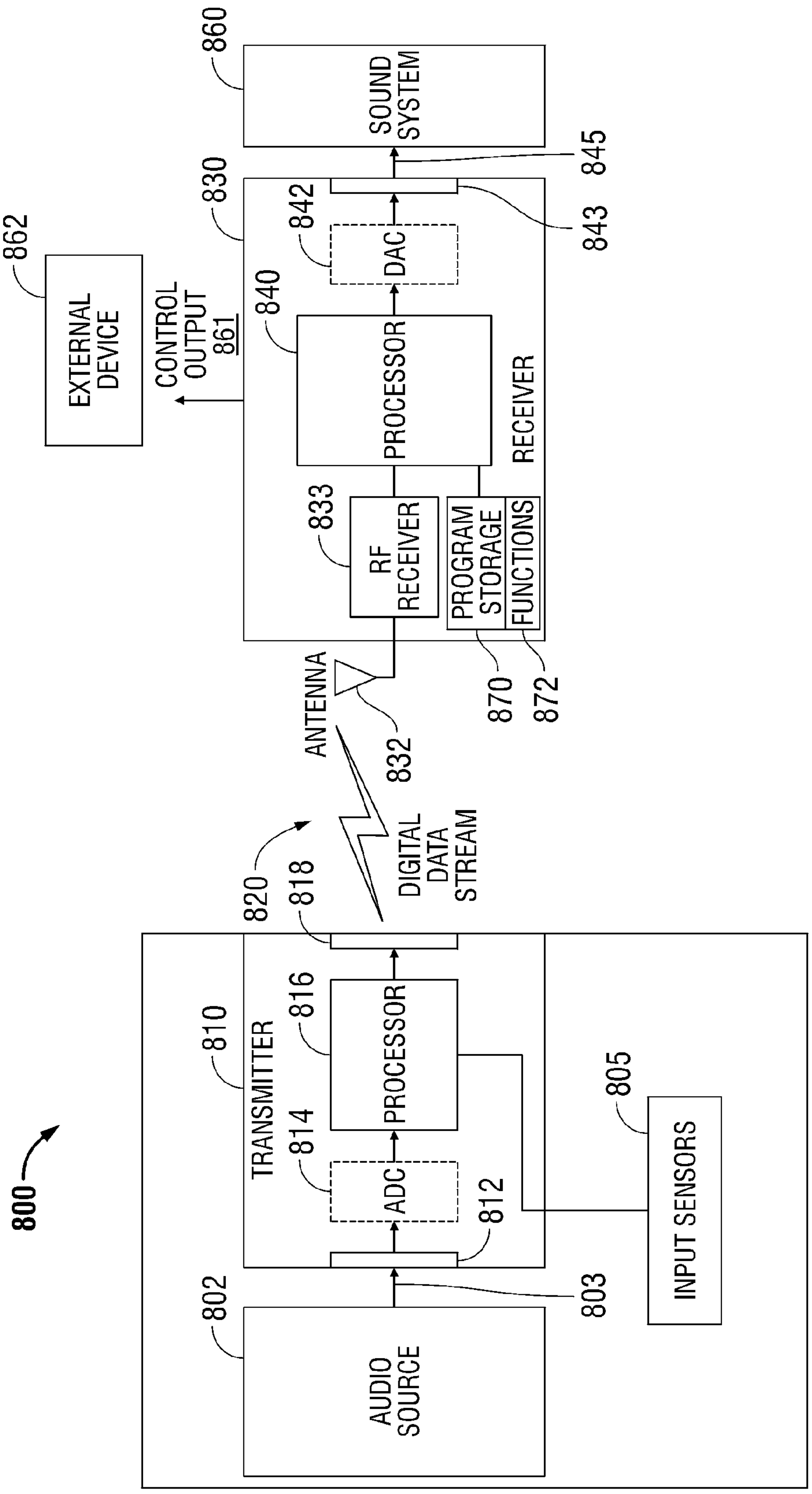
FIG. 8 is a block diagram of a system for the real-time wireless transmission of a digital audio signal and control data, according to one embodiment of the invention.

With reference now to FIG. 8, FIG. 8 is a block diagram of a system 800 for the real-time wireless transmission of a digital audio signal and control data, according to one embodiment of the invention. As shown in FIG. 8, an audio source 802 may be coupled to a transmitter 810. For example, audio source 802 may be a microphone, a guitar, a piano, a keyboard, a bass, or any type of musical instrument. In another embodiment, audio source 802 may be a music generator such as a compact disk (CD) player, a digital video disk (DVD) player, a MP3 player, a computer, a cassette player, a record player, or other types of digital or analog music generators.

Audio source 802 may be a digital or analog device. Typically, audio source 802 may be coupled via a wired connector 803 (analog or digital), such as an electric cable, to an input device (analog or digital) 812 of transmitter 810. Thus, transmitter 810 is coupled to the audio source 802. Additionally, transmitter 810 may be directly attached or built into audio source 802 so as to appear to be one device.

Input sensors 805 may be coupled to the audio source 802 or transmitter 810, or both when they are combined, dependent upon design considerations. For example, when transmitter 810 is built into the audio source 802, input sensors 805 may be present on audio source 802. In either case, information from input sensors 805 will be received and processed by a processor 816 of transmitter 810, as will be described in more detail later. In particular, different types of input sensors 805 will likewise be described in more detail later.

Transmitter 810 may include an analog to digital converter (ADC) 814 coupled to processor 816 and a digital wireless output device 818 coupled to processor 816.

It should be appreciated that ADC 814 may or may not be utilized dependant upon the type of audio source 802. For example, audio sources such as digital microphones may be directly coupled by digital input device 812 to processor 816. On the other hand, analog audio sources, such as an analog electric guitar or an analog microphone, may be connected via analog input device 812 to ADC 814 such that analog audio signals are converted by ADC 814 to digital audio signals for processing by processor 816.

For example, audio source 802 or transmitter 810 may include a button selectable by a user to indicate whether or not an analog or digital musical instrument or microphone is being utilized to turn on or off ADC 814. Alternatively, transmitter 810 may simply determine whether a digital or analog signal is being utilized and select or deselect ADC 814.

In either event, processor 816 of transmitter 810 is utilized to generate a digital data stream 820 (including control data and audio data) for transmission to a receiver 830 through digital wireless output device 818.

In particular, processor 816 combines control data with the digital audio data from the audio source and transmits the combined control data and digital audio signal as digital data stream 820. The control data may be selected by a user through input sensors 805. Transmitter 810 wirelessly transmits digital data stream 820 through digital wireless output device 818 to receiver 830.

In one embodiment, processor 816 may generate a first digital data stream and a second digital stream and transmitter 810 through digital wireless output device 818 may transmit the first digital data stream at a first radio frequency and the second digital data stream at a second radio frequency to receiver 830, as has been previously described in detail. In particular, if desired, processor 816 may utilize any of the previously-described multiple digital data stream transmission embodiments.

The digital representation of the digital audio signal from the audio source 802 and the control data from input sensors 805 is prepared by processor 816 for real-time wireless transmission. Thus, processor 816 generates a digital data stream 820 at a particular frequency for wireless transmission or a plurality of digital data streams at particular frequencies for wireless transmission (as previously described).

Examples of a processor 816 include a central processing unit (CPU), a microprocessor, an application specific integrated circuit (ASIC), a digital signal processor (DSP), a micro-controller, a finite state machine, a field program data array (FPGA), combinatorial logic, etc.

These functions may be implemented by processor 816 as one or more instructions (e.g. code segments), to perform the desired functions or operations of the invention. When implemented in software of firmware (e.g. by a software or firmware module), the elements of the present invention are the instructions/code segments to perform the necessary tasks. The instructions which when read and executed by a machine or processor, cause the machine or processor to perform the operations necessary to implement and/or use embodiments of the invention. The instructions or code segments can be stored in a machine readable medium (e.g. a processor readable medium or a computer program product), or transmitted by a computer data signal embodied in a carrier wave, or a signal modulated by a carrier, over a transmission medium or communication link.

Further, processor 816 may process the digital audio data such that it also includes additional codings such as: error correction code (ECC), cyclic redundancy check (CRC), control codes, information data, or other type of coding; that is embedded along with the digital audio data. Thus, control data and information data may also be included with the digital audio data to be wirelessly transmitted from transmitter 810 to receiver 830. For example, such control and information data that may be transmitted may include touch data, distance data, position data, user interface control data (e.g. from buttons, knobs, switches, etc.) from the musical instrument or microphone related to volume, gain, tone, pick-up selections, etc.

After the combined control data and digital audio signal is ready for wireless transmission, processor 816 through digital wireless output device 118 wirelessly transmits the combined control data and digital audio signal as digital data stream 820 to receiver 830. Particularly, the combined control data and digital audio signal may be sent as a single digital data stream at a fixed radio frequency, or as two separate radio frequencies, or as many as N frequencies, as previously described in detail.

Digital data stream 820 is received at receiver 830. For example, in one embodiment, receiver 830 may include an antenna 832 coupled to a RF receiver 833. Processor 840 then receives the combined control data and digital audio signal from RF receiver 833. Processor 840 then processes the control data to perform a user pre-defined function.

Receiver 830 further includes program storage 870 that stores user pre-defined functions 872. Program storage 870 is coupled to processor 840 to transfer user pre-defined functions to processor 840 such that processor 840 implements the user pre-defined functions, as will be described in more detail later. In particular, processor 840 may generate the digital audio signal from the digital data stream 820 as modified by the control data to perform a user pre-defined function. Program storage 870 may be a semiconductor memory, a volatile memory, a non-volatile memory, a hard disk, an optical disk, etc.

In one embodiment, processor 840 may generate the same digital audio signal from the digital data stream 820 and modify it with the control data in accordance with the user pre-defined function as implemented by processor 840 for transmission to a sound system 860 such that the sound system 860 can play-back the digital audio signal in accordance with the user pre-defined function. For example, sound system 860 may be an amplifier, a stereo, head-phones, or other well known types of sound systems.

Further, the generated digital audio signal as modified by the implemented user pre-defined function may be converted by a digital to analog converter (DAC) 842 into an analog signal that is transmitted through output device 843 and through wired connector 845 for play-back by sound system 860 that is an analog play-back sound system.

It should be appreciated that sound system 860, in some embodiments, may be a digital sound system and the digital audio signal as modified by the user pre-defined function may be directly played back, without conversion by DAC 842, by being sent though output device 843 and through wire connector 845 to sound system 860 that is a digital sound system.

For example, at the receiver 830, the user may select analog or digital play-back by a suitable button selection or receiver 830 may determine the type of sound system 860 attached to receiver 830 and selects whether to utilize or not utilize DAC 842. Additionally, receiver 830 may be directly attached to or embedded with a sound system 860 so as to appear as a single device.

Also, although receiver 830 is shown as utilizing one antenna 832 and one RF receiver 833 it should be appreciated that in other embodiments, multiple antennas and multiple RF receivers may be utilized for multiple digital data streams, as previously described in detail.

Additionally, either the analog or digital audio signals may be sent back to storage devices, recording equipment and devices, computers, stereos, etc. Further, the control data may also be sent out as control output data 861 to external devices 862 such as sound mixing effects, lighting, recording equipment and devices, computers, or other elements that are desired to be controlled.

In one embodiment, receiver 830 alters the digital audio signal based upon the received control data from the digital data stream 820 and the user pre-defined function. The user pre-defined function may be a function 872 stored in program storage 870 and implemented by processor 840 of receiver 830. In particular, audio source 802 (e.g. microphone, guitar, or other musical instrument) or transmitter 810 may be fitted with input sensors 805 such as switches, dials, buttons, pedals, etc. that a user can select, push, or adjust. Input sensors 805 allow a user to select control data in which the control data is transmitted as a control data component in the combined control data and digital audio signal of the digital data stream 820 to the receiver 830 such that receiver 830 processes the control data to perform user pre-defined functions based upon the selected control data. For example, possible applications at receiver 830 may be to turn a microphone audio signal on or off, adjust the monitoring level up or down, or controlling other elements of a performance (e.g. such as lighting).

Figure 9A:
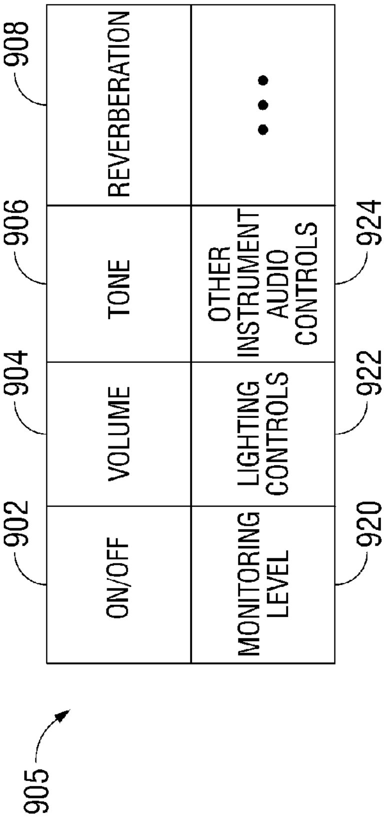
FIG. 9A is a block diagram illustrating input sensor controls, according to one embodiment of the invention.

As one example, with reference to FIG. 9A, a plurality of different input sensor controls 905 are shown. FIG. 9A is a block diagram illustrating input sensor controls 905 that may be implemented as input sensors 805 of FIG. 8, according to one embodiment of the invention. For example, the input sensors 905 may include an on/off control 902, a volume control 904, a tone control 906, a reverberation control 908, a monitoring level control 920, a lighting control 922, and another instrument audio control 924. It should be appreciated that these are merely examples and that a wide variety of different types of input sensor controls implemented by switches, dials, buttons, pedals, etc. as input sensors 805 of audio source 802 or transmitter 810 may be utilized. These control data components are sent with the digital data stream 820 in conjunction with the audio data and may then be implemented by receiver 830, as will be described.

Figure 9B:
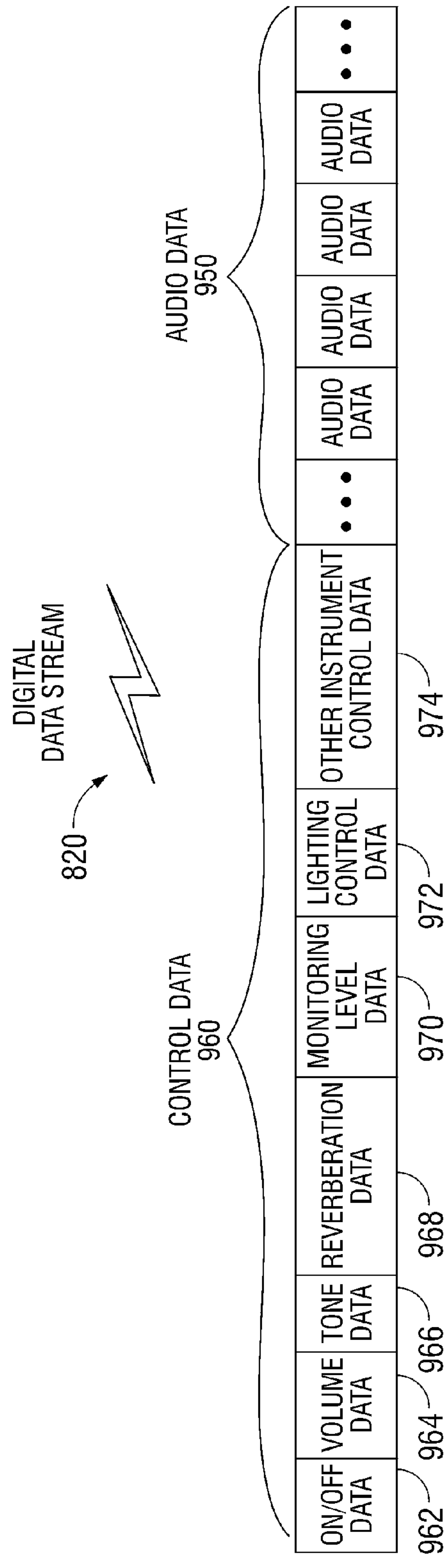
FIG. 9B is a block diagram illustrating components of a digital data stream, according to one embodiment of the invention.

Turning now to FIG. 9B, FIG. 9B is a block diagram illustrating components of digital data stream 820, according to one embodiment of the invention. As can be seen in FIG. 9B, digital data stream 820 may include digital audio data 950 from the audio source 802 as well as control data 960 that includes control data components that reflect the settings of input sensors 905 by a user. As an example, control data 960 may include on/off data 962, volume data 964, tone data 966, reverberation data 968, monitoring level data 970, lighting control data 972, and other instrument control data 974.

Receiver 830 under the control of processor 840 in combination with user pre-defined functions 872 may process the on/off data 962, the volume data 964, the tone data 966, the reverberation data 968, the monitoring level data 970, the lighting control data 972, and the other instrument control data 974 as set by the user via the input sensor 805. For example, based upon input sensor 805 settings made by the user at the transmitter 810 and user pre-defined functions 872 at the receiver 830, receiver 830 may turn the sound system 860 on or off, increase or decrease the volume, tone, reverberation or monitoring level, etc. Additionally, other pre-defined functions such as lighting controls and other instrument audio controls may be processed by receiver 830 to control external devices 862 such as lights and other instruments.

As one particular example, utilizing the previously-described transmitter 810 and receiver 830, an audio source microphone 802 through input sensor 805 may turn sound system 860 on or off. As another example, an analog electric guitar audio source 802 through input sensors 805 may increase the volume and tone, and reduce the reverberation and monitoring level, and wirelessly transmit these control data components 960 for implementation by receiver 830 under the control of processor 840 and previous user pre-defined functions 872 such that these sound functions are implemented by sound system 860. Further, through input sensors 805, lighting control data 972 may be sent to receiver 830 under the control of processor 840 and previous user pre-defined functions 872, such that a user may utilize a microphone audio source 802 to control the lighting of external lighting devices 862. Even further, a user utilizing an audio source 802 may wirelessly transmit other instrument audio controls (other instrument control data 974) to be processed by receiver 830 to control another instrument such as turning down a bass instrument that is too loud.

It should be appreciated by those of skill in the art that receiver 830 under the control of processor 840 implementing user pre-defined functions 872 may implement a wide variety of control data components 960 wirelessly received from transmitter 810 by a user setting control data through input sensors 805 of an audio source 802 such as a musical instrument or microphone.

Figure 10A:
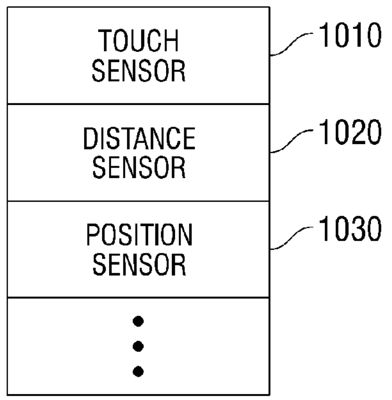
FIG. 10A is a block diagram illustrating a plurality of sensors that may be located with the audio source or transmitter, according to one embodiment of the invention.

With reference now to FIG. 10A, FIG. 10A is a block diagram illustrating a plurality of sensors that may be located with the audio source 802 or transmitter 810, according to one embodiment of the invention. In one embodiment, audio source 802 may include a touch sensor 1010 to determine touch data.

Figure 10B:
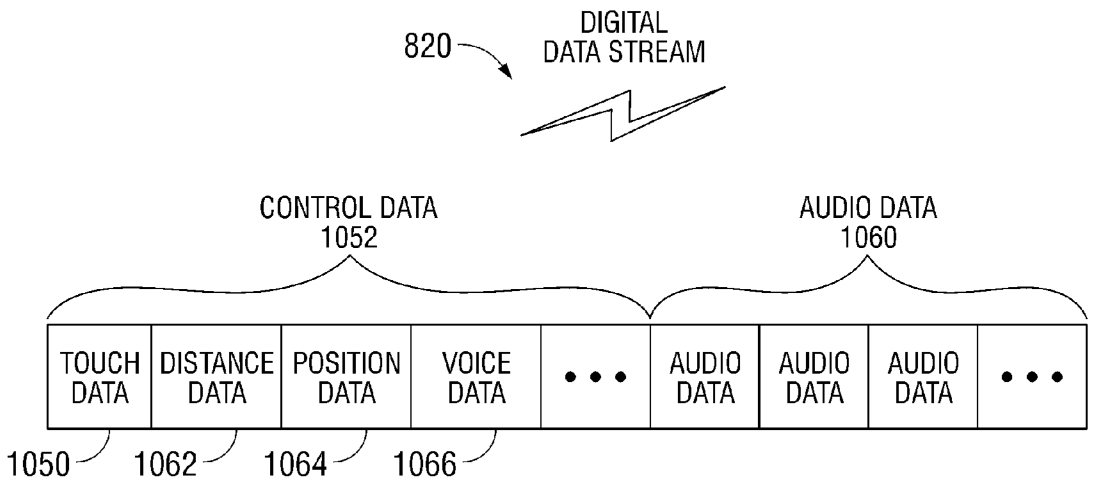
FIG. 10B is a block diagram illustrating components of a digital data stream, according to one embodiment of the invention.

As shown in FIG. 10B, the touch data 1050 may be sent as a control data 1052 component in the combined control data and digital audio signal (digital data stream 820) to receiver 830. Receiver 830 processes the touch data 1050 in accordance with user pre-defined functions 872. In one embodiment, receiver 830 processes the touch data 1050 to determine if the audio source 802 is being held by a user. If the audio source is held, receiver 830 may process the digital audio signal (audio data 1060) for output to sound system 860, whereas, if the audio source is not held, receiver 830 does not process the digital audio signal for output. It should be appreciated that the touch sensor present on an audio source such as a microphone, guitar, or other musical instrument may be a capacitive coupler, a heat sensor, or a pressure sensor.

As an example, the body of a microphone audio source 802 may include a capacitive coupler, a heat sensor, a pressure sensor, or some other type of sensor such that digital data stream 820 includes a touch data component 1050 that receiver 830 under the control of processor 840 and user pre-defined function 872 utilizes to determine whether or not the microphone is being held. Thus, if the touch data component 1050 indicates that the microphone is not being held, then receiver 830 may turn off sound system 860.

In another embodiment, audio source 802 may include a distance sensor 1020 that is used to determine the estimated distance from the audio source to the user. The distance data component 1062 is transmitted as a control data 1052 in the combined control data and digital audio signal stream 820 to receiver 830. Receiver 830 under the control of processor 840 and user pre-defined function 872 processes the distance data. In one embodiment, receiver 830 processes the distance data to determine if the distance data is beyond a pre-determined turn-off threshold and, if so, receiver 830 does not process the digital audio signal for output to sound system 860.

In another embodiment, audio source 802 utilizes distance sensor 1020 in order to determine the estimated distance data from the audio source 802 to the user in which the distance data component 1062 is transmitted as a control data component 1052 in the combined control data and digital audio signal data stream 820 to receiver 830. In this case, receiver 830 processes the distance data 1062 to determine if the distance data is beyond a pre-determined modification threshold, and if so, receiver 830 reduces the signal gain of the digital audio signal for output based upon a distance modification formula implemented by the processor 840 in accordance with user pre-defined function 872.

As an example, a microphone could include a distance sensor to estimate distance data for wireless transmission to, and receipt and processing by, receiver 830, such that the receiver 830 can estimate the distance a user is from the front of the microphone. This data may then be used by receiver 830 to adjust the signal gain and/or frequency response of the audio transmission, or to turn off the audio transmission, to the sound system 860 if the user is beyond a predetermined distance. For example, if a user is two feet away from a microphone, the sound to the sound system 860 may simply be turned off.

It should be appreciated that a wide variety of different types of distance sensors may be utilized by the audio source such as an infrared sensor, an ultrasonic sensor, or an electronic sensor.

In another embodiment, audio source 802 may include a position sensor 1030. Position sensor 1030 may be utilized to determine a position and movement measurement of the audio source. A position and movement measurement data component 1064 may be transmitted as control data 1052 in the combined control data and digital audio signal stream 820 transmitted to receiver 830. Receiver 830 under the control of processor 840 and user pre-defined function 872 may process the position and movement measurement data 1064 to determine if the audio source is pointed downward or falling, and, if so, the receiver 830 will not process the digital audio signal for output to sound system 860.

In another embodiment, receiver 830 may process the position and movement measurement data 1064 to determine if a pre-defined gesture has been made by the user of the audio source and, if so, to command that a user pre-defined function associated with the pre-defined gesture be performed. Position sensor 1030 may for example, be an accelerometer or a gyroscope coupled within or to the audio source. Thus, receiver 830 by utilizing data transmitted from a built-in accelerometer and/or gyroscope on one or more axes, receiver 830 may control aspects of the audio signal to be transmitted to the sound system 860.

As an example, the audio signal for a microphone may be muted by receiver 830 if receiver 830 determines that the microphone is pointed downward. Further, the audio signal may be muted by receiver 830 if receiver 830 determines that the microphone is falling or likely to hit the ground.

As another example, positional data may be utilized by receiver 830 under the control of processor 840 to interpret gestures initiated by a user and can be utilized to control specific user pre-defined functions 872 as selected by the user. For example, the user can program receiver 830 to understand that moving a microphone in a circle should be processed by the processor 840 of receiver 830 to be interpreted to mean that the user wants to turn up the volume of the microphone or to turn off or reduce the volume of other pre-set instruments.

In another embodiment, receiver 830 under the control of processor 840 and a user pre-defined function 872, based upon the receipt of a voice recognition control data component 1066 of the digital data stream 820, determines whether to apply voice recognition processing to received digital audio data 1060. In particular, receiver 830 may perform voice recognition processing on received digital audio data 1060 to recognize a spoken command transmitted with the received digital audio data and to perform a pre-defined user function associated with the spoken command. It should be appreciated that voice recognition processing via software, firmware, etc., is well known in the art.

For example, user pre-defined functions that may be preprogrammed at receiver 830 associated with spoken commands may include such functions as: a user pre-defined on/off function, a user pre-defined volume function, a user pre-defined tone function, a user pre-defined reverberation function, a user pre-defined monitoring level function, a user pre-defined lighting function, and a user pre-defined other instrument audio control function. These are just examples of user pre-defined functions that may be pre-programmed at the receiver 830 for implementation based upon received voice data commands over the digital data stream 820 from transmitter 810.

As an example, a user operating a microphone may speak such commands as: "turn the microphone on"; "increase the volume to 10"; "turn all lighting to medium"; or "turn up the bass to 5". After voice data component 1066 control data has been identified, voice audio data 1060 from digital data stream 820 will be processed by receiver 830 utilizing pre-defined functions 872 stored in the receiver such that receiver 830 implements these voice recognized commands to sound system 860 and the other external devices 862.

In one embodiment, audio source 802 may include an input sensor 805 to allow a user to select a voice recognition control data component in which the voice recognition control data component 1066 of the digital data signal 820 is transmitted to the receiver 830. In one particular embodiment, a user may initiate a control signal to indicate to receiver 830 that receiver 830 should interpret a voice command. As an example, a user may press and hold a control button on the microphone or the transmitter 810. The button press may be transmitted control data, such as, voice recognition control data component 1066, or as another control signal, and receiver 830 may be programmed to recognize the button press to mean that receiver 830 should mute the receiver's audio output (e.g. to prevent the audience from hearing the voice command) and to interpret the voice command as programmed. Then, by receiving control data that the button has been released, receiver 830 may then turn the audio output back on. It should be appreciated that this is merely one example and that many other techniques for receiving and implementing voice commands by receiver 830 may be utilized.

In another embodiment, a button press or a gesture transmitted as a control signal to receiver 830 may cause receiver 830 to transmit the audio signal (e.g. audio data 1060) out of a different output (e.g. through control output 861 to an external device 862). For example, a user may press and hold an input sensor button 805 of a microphone and then speak into the microphone, and receiver 830 may switch to an output that is only being routed to the sound person, or to the monitors of other musicians, and not to the audience speakers (e.g. sound system 860). This may be useful for giving musical direction, requesting an audio adjustment, etc.

In another embodiment of the invention, receiver 830 may transmit a pre-determined command to a pre-determined device to perform a user pre-defined function. As previously-discussed, receiver 830 may process a control data command received from transmitter 810 to a sound system 860 to perform a user pre-defined function. These types of examples include an audio effect, a sound mixing effect, etc. As one particular example, receiver 830 under the control of processor 840 may increase the volume of an amplifier, increase the sound of a guitar, or alter a sound mixing effect, based upon a pre-determined audio command.

Additionally, based upon the receipt of a command received as control data component to affect an external device, receiver 830 under the control of processor 840 may process such a pre-determined command to a pre-determined device to perform the user pre-defined function. For example, such pre-defined functions to an external device 862 may include a lighting command to a lighting device.

Thus, data communicated from transmitter 810 may also be used for functions other than controlling audio output. Receiver 830 may pass such control output 861 to external devices 862 through any number of standard communications methods (Ethernet, USB, MIDI, FireWire, WiFi, etc.) to a plurality of other different types of external devices 862. For example, the user may control other external devices such as computers for music recording, light sources, or other external devices that may be utilized for live performance and/or recording. As another example, based on the previously-described position information transmitted as position data component 1064 of control data 1054 of the digital data stream 820, this position data may also be processed by receiver 830 to control external devices such as having a spotlight automatically follow a performer when a performer moves the microphone in a user pre-defined manner.

It should be appreciated that by utilizing aspects of the invention related to a transmitter 810, a digital data stream 820 including control data 1052 and audio data 1060, and a receiver 830 including a processor 840 to process user pre-defined functions 872 that a wide variety of pre-defined user functions may be implemented. As an example, receiver 830 may be set with user pre-defined functions such that a microphone will only be turned on through the sound system 860 if a user is holding it and a user is speaking to the microphone from a distance of 3 to 12 inches. Alternatively, receiver 830 may be pre-set to attenuate down by a pre-determined amount of decibels (dBs) sound received from a user of the microphone as the user moves the microphone away greater than 12 inches. Advantageously, receiver 830 may process received control data 1052 in a wide variety of manners to implement a wide variety of user pre-defined functions.

As yet another example, utilizing the previously-described wireless transmission system, by utilizing position data component 1064 of control data 1052 of digital data stream 820 for receipt by receiver 830, processor 840 of receiver 830 may interpret gestures made by a user of the microphone. For example, receiver 830 may include user pre-defined functions 872 such that if a user turns the microphone in a certain pre-defined gesture, receiver 830 will turn up the volume of sound system 860 or if the microphone is moved in an opposite way, receiver 830 will automatically turn down the volume. In particular, receiver 830 may be programmed to interpret a wide variety of different gestures that may be used by a user utilizing a microphone or musical instrument with transmitter 810 to modify sound characteristics of sound system 860 or to modify the activity of external devices 862, as previously described.

Further, it should be appreciated that any type of input sensor may be utilized to send control data 1052 components such as touch data 1050, distance data 1062, position data 1064, voice data 1066, etc., to receiver 830 such that a wide variety of user pre-defined functions 872 may be implemented to effect sound system components 860 and external device components 862. These include a wide variety of different types of sound system effects such as alterations of volume, tone, reverberation, monitoring level, as well as effects to external devices such as lighting control and recording options. It should further be appreciated that receiver will automatically process these functions or a sound technician may read the data processed by the receiver and implement them.

While the present invention and its various functional components have been described in particular embodiments, it should be appreciated the embodiments of the present invention can be implemented in hardware, software, firmware, middleware or a combination thereof and utilized in systems, subsystems, components, or sub-components thereof.

When implemented in software or firmware, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for real-time wireless transmission of a digital data stream including a digital audio signal and control data comprising:

an audio source;

a transmitter coupled to the audio source, the transmitter including a processor to:

combine control data with a received digital audio signal to generate the digital data stream, the received digital audio signal including an audio signal generated by a musical instrument or by a microphone and the control data in the digital data stream including user input controls or sensor data, and transmit the digital data stream; and a receiver including a processor to:

receive the digital data stream transmitted from the transmitter and process the control data included in the received digital data stream to perform a user pre-defined function based on the processed control data.

2. The system of claim 1, wherein the audio source is the musical instrument.

3. The system of claim 1, wherein the audio source is the microphone.

4. The system of claim 1, wherein the receiver further alters the digital audio signal based upon the control data and the user pre-defined function.

5. The system of claim 1, wherein the audio source further comprises an input sensor to allow a user to select control data, the control data being transmitted as a control data component in the digital data stream to the receiver, the receiver to process the control data to perform a user pre-defined function based upon the selected control data.

6. The system of claim 5, wherein the input sensor includes at least one of a switch, a dial, a button, and a pedal.

7. The system of claim 5, wherein the input sensor includes at least one of an on/off control, a volume control, a tone control, a reverberation control, a monitoring level control, a lighting control, and an other instrument audio control and the receiver processes at least one of a user pre-defined on/off function, a user pre-defined volume function, a user pre-defined tone function, a user pre-defined reverberation function, a user pre-defined monitoring level function, a user pre-defined lighting function, and a user pre-defined other instrument audio control function, respectively.

8. The system of claim 1, wherein the audio source further comprises a touch sensor to determine touch data, the touch data being transmitted as a control data component in the digital data stream to the receiver and the receiver to process the touch data.

9. The system of claim 8, wherein the receiver processes the touch data to determine if the audio source is held wherein the receiver processes the digital audio signal for output or not held wherein the receiver does not process the digital audio signal for output.

10. The system of claim 8, wherein the touch sensor is at least one of a capacitive coupler, a heat sensor, and a pressure sensor.

11. The system of claim 1, wherein the audio source further comprises a distance sensor to determine estimated distance data from the audio source to the user, the distance data being transmitted as a control data component in the digital data stream to the receiver and the receiver to process the distance data.

12. The system of claim 11, wherein the receiver processes the distance data to determine if the distance data is beyond a pre-determined turn-off threshold and if so the receiver does not process the digital audio signal for output.

13. The system of claim 11, wherein the receiver processes the distance data to determine if the distance data is beyond a pre-determined modification threshold and if so the receiver reduces the signal gain of the digital audio signal for output based upon a distance modification formula.

14. The system of claim 11, wherein the distance sensor is at least one of an infrared sensor and an ultrasonic sensor.

15. The system of claim 1, wherein the audio source includes a position sensor, the position sensor to determine a position and movement measurement of the audio source, the position and movement measurement being transmitted as a control data component in the digital data stream to the receiver.

16. The system of claim 15, wherein the receiver processes the position and movement measurement to determine if the audio source is pointed downward or falling and if so the receiver does not process the digital audio signal for output.

17. The system of claim 15, wherein the receiver processes the position and movement measurement to determine a pre-defined gesture and to command that a user pre-defined function associated with the pre-defined gesture be performed.

18. The system of claim 15, wherein the position sensor is at least one of an accelerometer and a gyroscope.

19. The system of claim 1, wherein the audio source further comprises an input sensor to allow a user to select a voice recognition control data component, the voice recognition control data component being transmitted as the control data component in the digital data stream to the receiver.

20. The system of claim 19, wherein the receiver, based upon the receipt of the voice recognition control data, determines whether to apply voice recognition processing to the received digital audio signal.

21. The system of claim 20, wherein the receiver performs voice recognition processing on the received digital audio signal to recognize a spoken command associated with the received digital audio signal and to perform a pre-defined function associated with the spoken command.

22. The system of claim 21, wherein the pre-defined function associated with the spoken command includes at least one of a user pre-defined on/off function, a user pre-defined volume function, a user pre-defined tone function, a user pre-defined reverberation function, a user pre-defined monitoring level function, a user pre-defined lighting function, and a user pre-defined other instrument audio control function, respectively.

23. The system of claim 1, wherein the receiver transmits a pre-determined command to a pre-determined device to perform the user pre-defined function.

24. The system of claim 23, wherein the receiver transmits a pre-determined audio command to a sound system to perform the user pre-defined function.

25. The system of claim 24, wherein the pre-determined audio command includes at least one of an audio effect and a sound mixing effect.

26. The system of claim 23, wherein the receiver transmits a pre-determined lighting command to a lighting device to perform the user pre-defined function.

27. A method for real-time wireless transmission of a digital data stream including a digital audio signal and control data comprising:

combining control data with the digital audio signal from an audio source by a transmitter to generate the digital data stream, the digital audio signal including an audio signal generated by a musical instrument or by a microphone and the control data in the digital data stream including user input controls or sensor data;

transmitting the digital data stream from the transmitter;

receiving the digital data stream from the transmitter by a receiver; and processing the control data from the received digital data stream to perform a user pre-defined function based on the processed control data.

28. The method of claim 27, wherein the audio source is the musical instrument.

29. The method of claim 27, wherein the audio source is the microphone.

30. The method of claim 27, further comprising altering the digital audio signal based upon the control data and the user pre-defined function.

31. The method of claim 27, wherein the audio source further comprises an input sensor to allow a user to select control data, the control data being transmitted as a control data component in the digital data stream to a receiver, the receiver to process the control data to perform a user pre-defined function based upon the selected control data.

32. The method of claim 31, wherein the input sensor includes at least one of a switch, a dial, a button, and a pedal.

33. The method of claim 31, wherein the input sensor includes at least one of an on/off control, a volume control, a tone control, a reverberation control, a monitoring level control, a lighting control, and an other instrument audio control and the receiver processes at least one of a user pre-defined on/off function, a user pre-defined volume function, a user pre-defined tone function, a user pre-defined reverberation function, a user pre-defined monitoring level function, a user pre-defined lighting function, and a user pre-defined other instrument audio control function, respectively.

34. The method of claim 27, wherein the audio source further comprises a touch sensor to determine touch data, the touch data being transmitted as a control data component in the digital data stream to a receiver, wherein the receiver processes the touch data.

35. The method of claim 34, wherein the receiver processes the touch data to determine if the audio source is held wherein the receiver processes the digital audio signal for output or not held wherein the receiver does not process the digital audio signal for output.

36. The method of claim 34, wherein the touch sensor is at least one of a capacitive coupler, a heat sensor, and a pressure sensor.

37. The method of claim 27, wherein the audio source further comprises a distance sensor to determine estimated distance data from the audio source to a user, the distance data being transmitted as a control data component in the digital data stream to a receiver, wherein the receiver processes the distance data.

38. The method of claim 37, wherein the receiver processes the distance data to determine if the distance data is beyond a pre-determined turn-off threshold and if so the receiver does not process the digital audio signal for output.

39. The method of claim 37, wherein the receiver processes the distance data to determine if the distance data is beyond a pre-determined modification threshold and if so the receiver reduces the signal gain of the digital audio signal for output based upon a distance modification formula.

40. The method of claim 37, wherein the distance sensor is at least one of an infrared sensor and an ultrasonic sensor.

41. The method of claim 27, wherein the audio source includes a position sensor, the position sensor to determine a position and movement measurement of the audio source, the position and movement measurement being transmitted as a control data component in the digital data stream to a receiver.

42. The method of claim 41, wherein the receiver processes the position and movement measurement to determine if the audio source is pointed downward or falling and if so the receiver does not process the digital audio signal for output.

43. The method of claim 41, wherein the receiver processes the position and movement measurement to determine a pre-defined gesture and to command that a user pre-defined function associated with the pre-defined gesture be performed.

44. The method of claim 41, wherein the position sensor is at least one of an accelerometer and a gyroscope.

45. The method of claim 27, wherein the audio source further comprises an input sensor to allow a user to select a voice recognition control data component, the voice recognition control data component being transmitted as the control data component in the digital data stream to a receiver.

46. The method of claim 45, wherein the receiver, based upon the receipt of the voice recognition control data, determines whether to apply voice recognition processing to the received digital audio signal.

47. The method of claim 46, wherein the receiver performs voice recognition processing on the received digital audio signal to recognize a spoken command associated with the received digital audio signal and to perform a pre-defined function associated with the spoken command.

48. The method of claim 47, wherein the pre-defined function associated with the spoken command includes at least one of a user pre-defined on/off function, a user pre-defined volume function, a user pre-defined tone function, a user pre-defined reverberation function, a user pre-defined monitoring level function, a user pre-defined lighting function, and a user pre-defined other instrument audio control function, respectively.

49. The method of claim 27, wherein a receiver transmits a pre-determined command to a pre-determined device to perform the user pre-defined function.

50. The method of claim 49, wherein the receiver transmits a pre-determined audio command to a sound system to perform the user pre-defined function.

51. The method of claim 50, wherein the pre-determined audio command includes at least one of an audio effect and a sound mixing effect.

52. The method of claim 49, wherein the receiver transmits a pre-determined lighting command to a lighting device to perform the user pre-defined function.

* * * * *